(12) United States Patent
Villanueva et al.

(10) Patent No.: US 8,173,295 B2
(45) Date of Patent: May 8, 2012

(54) METHOD AND APPARATUS FOR BATTERY POTTING

(75) Inventors: Ernest Matthew Villanueva, Mountain View, CA (US); Brian Charles Hewett, Los Altos Hills, CA (US); William Vucich Beecher, San Francisco, CA (US); Dorian Watkins West, Menlo Park, CA (US); Scott Ira Kohn, Menlo Park, CA (US); Eugene Michael Berdichevsky, Palo Alto, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 837 days.

(21) Appl. No.: 11/779,834

(22) Filed: Jul. 18, 2007

(65) Prior Publication Data

US 2009/0023060 A1   Jan. 22, 2009

(51) Int. Cl.
*H01M 2/00* (2006.01)
*H01M 2/04* (2006.01)
*H01M 2/08* (2006.01)
*H01M 2/10* (2006.01)
*H01M 2/14* (2006.01)
*H01M 2/18* (2006.01)

(52) U.S. Cl. ....... 429/159; 29/623.4; 156/349; 429/100; 429/129; 429/156; 429/163; 429/167; 429/185; 429/247

(58) Field of Classification Search .................. None
See application file for complete search history.

(56) References Cited

U.S. PATENT DOCUMENTS

| | | | |
|---|---|---|---|
| 5,288,564 A | 2/1994 | Klein et al. | |
| 5,989,300 A | 11/1999 | Eshraghi | |
| 6,410,185 B1 * | 6/2002 | Takahashi et al. | 429/163 |
| 7,229,712 B2 | 6/2007 | Eshraghi et al. | |
| 2004/0202927 A1 * | 10/2004 | Drea et al. | 429/129 |

FOREIGN PATENT DOCUMENTS

| | | | |
|---|---|---|---|
| JP | 03190052 A * | 8/1991 | |
| WO | WO-02/09212 | 1/2002 | |
| WO | WO-2009012036 A1 | 1/2009 | |

OTHER PUBLICATIONS

Application Serial No. PCT/US2008/068479, International Search Report and Written Opinion mailed Oct. 27, 2008, 9 pgs.

* cited by examiner

*Primary Examiner* — Melvin C Mayes
*Assistant Examiner* — Colin W Slifka
(74) *Attorney, Agent, or Firm* — Patent Law Office of David G. Beck

(57) ABSTRACT

One embodiment includes a bottom clamshell and a top clamshell sandwiching a first battery and a second battery, with a fill port extending from a top surface of the top clamshell through to the bottom surface of the top clamshell and to a space between the first and second batteries. The embodiment includes a protrusion coupled to the top clamshell proximate to the fill port and extending into the space, wherein the protrusion at least partially occludes a direct path through the fill port to the space.

15 Claims, 5 Drawing Sheets

METHOD AND APPARATUS FOR BATTERY POTTING

BACKGROUND

Some applications desire to use multiple battery cells to power electronics. These applications often desire that the cells be mechanically coupled together. This is problematic, especially with large numbers of battery cells. What is needed are methods and apparatus for mechanically connecting the cells.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1:
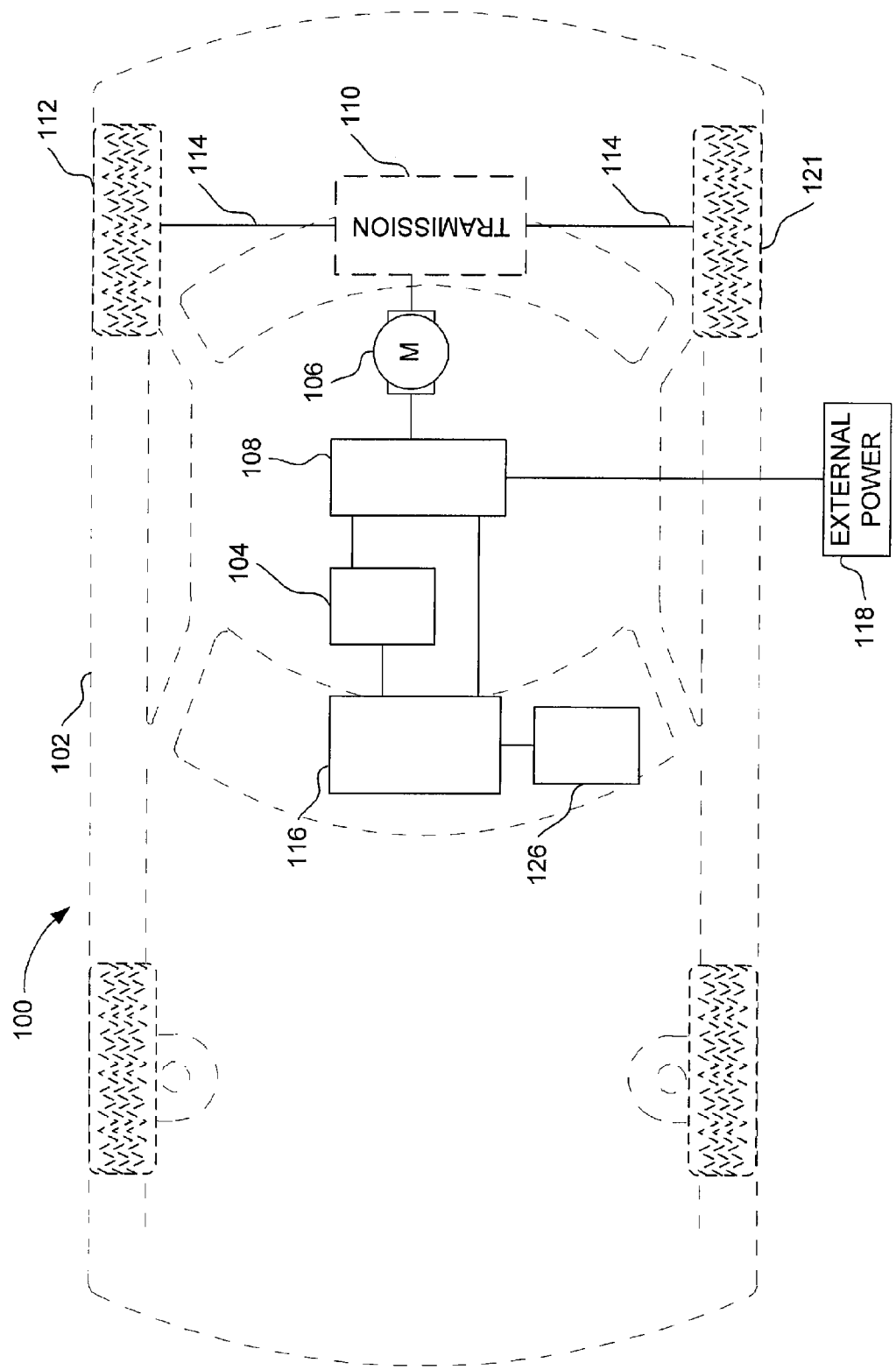
FIG. 1 is a high level diagram of an electric vehicle, according to one embodiment.

FIG. 1 shows a vehicle system 100, according to one embodiment of the present subject matter. In various embodiments, the vehicle 102 is an electric vehicle and includes a vehicle propulsion battery 104 and at least one propulsion motor 106 for converting battery energy into mechanical motion, such as rotary motion. The present subject matter includes examples in which the vehicle propulsion battery 104 is a subcomponent of an energy storage system ("ESS"). An ESS includes various components associated with transmitting energy to and from the vehicle propulsion battery 104 in various examples, including safety components, cooling components, heating components, rectifiers, etc. The inventors have contemplated several examples of ESSs and the present subject matter should not be construed to be limited to the configurations disclosed herein, as other configurations of a vehicle propulsion battery 104 and ancillary components are possible.

The battery includes one or more lithium ion cells in various examples. In some examples, the battery 104 includes a plurality of lithium ion cells coupled in parallel and/or series. Some examples include cylindrical lithium ion cells. In certain examples, the battery 104 includes one or more cells compatible with the 18650 battery standard, but the present subject matter is not so limited. Some examples include a first plurality of cells connected in parallel to define a first brick of cells, with a second plurality of cells connected in parallel to define a second brick of cells, with the first brick and the second brick connected in series. Some examples connect 69 cells in parallel to define a brick. Battery voltage, and as such, brick voltage, often ranges from around 3.6 volts to about 4.2 volts in use. In part because the voltage of batteries ranges from cell to cell, some instances include voltage management systems to maintain a steady voltage. Some embodiments connect 9 bricks in series to define a sheet. Such a sheet has around 35 volts. Some instances connect 11 sheets in series to define the battery of the ESS. The ESS will deliver around 385 volts in various examples. As such, some examples include approximately 6,831 cells which are interconnected.

Additionally illustrated is an energy converter 108. The energy converter 108 is part of a system which converts energy from the vehicle propulsion battery 104 into energy useable by the at least one propulsion motor 106. In some examples, the battery 104 powers the motor 106 to propel the vehicle. In certain instances, the energy flow is from the at least one propulsion motor 106 to the vehicle propulsion battery 104. This can happen during regenerative braking, for instance. As such, in some examples, the vehicle propulsion battery 104 transmits energy to the energy converter 108, which converts the energy into energy usable by the at least one propulsion motor 106 to propel the electric vehicle. In additional examples, the at least one propulsion motor 106 generates energy that is transmitted to the energy converter 108. In these examples, the energy converter 108 converts the energy into energy which can be stored in the vehicle propulsion battery 104. In certain examples, the energy converter 108 includes transistors. Some examples include one or more field effect transistors. Some examples include metal oxide semiconductor field effect transistors. Some examples include one more insulated gate bipolar transistors. As such, in various examples, the energy converter 108 includes a switch bank which is configured to receive direct current ("DC") power from the vehicle propulsion battery 104 and to output a three-phase alternating current ("AC") power the vehicle propulsion motor 106. In some examples, the energy converter 108 is configured to convert a three phase signal from the vehicle propulsion motor 106 to DC power to be stored in the vehicle propulsion battery 104. Some examples of the energy converter 108 convert energy from the vehicle propulsion battery 104 into energy usable by electrical loads other than the vehicle propulsion motor 106. Some of these examples switch energy from approximately 390 Volts to 14 Volts.

The propulsion motor 106 is a three phase alternating current ("AC") propulsion motor, in various examples. Some examples include a plurality of such motors. The present subject matter can optionally include a transmission or gearbox 110 in certain examples. While some examples include a 1-speed transmission, other examples are contemplated. Manually clutched transmissions are contemplated, as are those with hydraulic, electric, or electrohydraulic clutch actuation. Some examples employ a dual-clutch system that, during shifting, phases from one clutch coupled to a first gear to another coupled to a second gear. Rotary motion is transmitted from the transmission 110 to wheels 112 via one or more axles 114, in various examples.

A vehicle management system 116 is optionally provided which provides control for one or more of the vehicle propulsion battery 104 and the energy converter 108. In certain examples, the vehicle management system 116 is coupled to vehicle system which monitors a safety system (such as a crash sensor). In some examples the vehicle management system 116 is coupled to one or more driver inputs (e.g., an accelerator). The vehicle management system 116 is configured to control power to one or more of the vehicle propulsion battery 104 and the energy converter 108, in various embodiments.

External power 118 is provided to communicate energy to the vehicle propulsion battery 104, in various examples. In various embodiments, external power 118 includes a charging station that is coupled to a municipal power grid. In certain examples, the charging station converts power from a 110V AC power source into DC power storable by the vehicle propulsion battery 104. In additional examples, the charging station converts power from a 120V AC power source into power storable by the vehicle propulsion battery 104. Some embodiments include converting energy from the battery 104 into power usable by a municipal grid. The present subject matter is not limited to examples in which a converter for converting energy from an external source to energy usable by the vehicle 100 is located outside the vehicle 100, and other examples are contemplated.

Some examples include a vehicle display system 126. The vehicle display system 126 includes a visual indicator of system 100 information in some examples. In some embodiments, the vehicle display system 126 includes a monitor that includes information related to system 100. Some instances include one or more lights.

Figure 2:
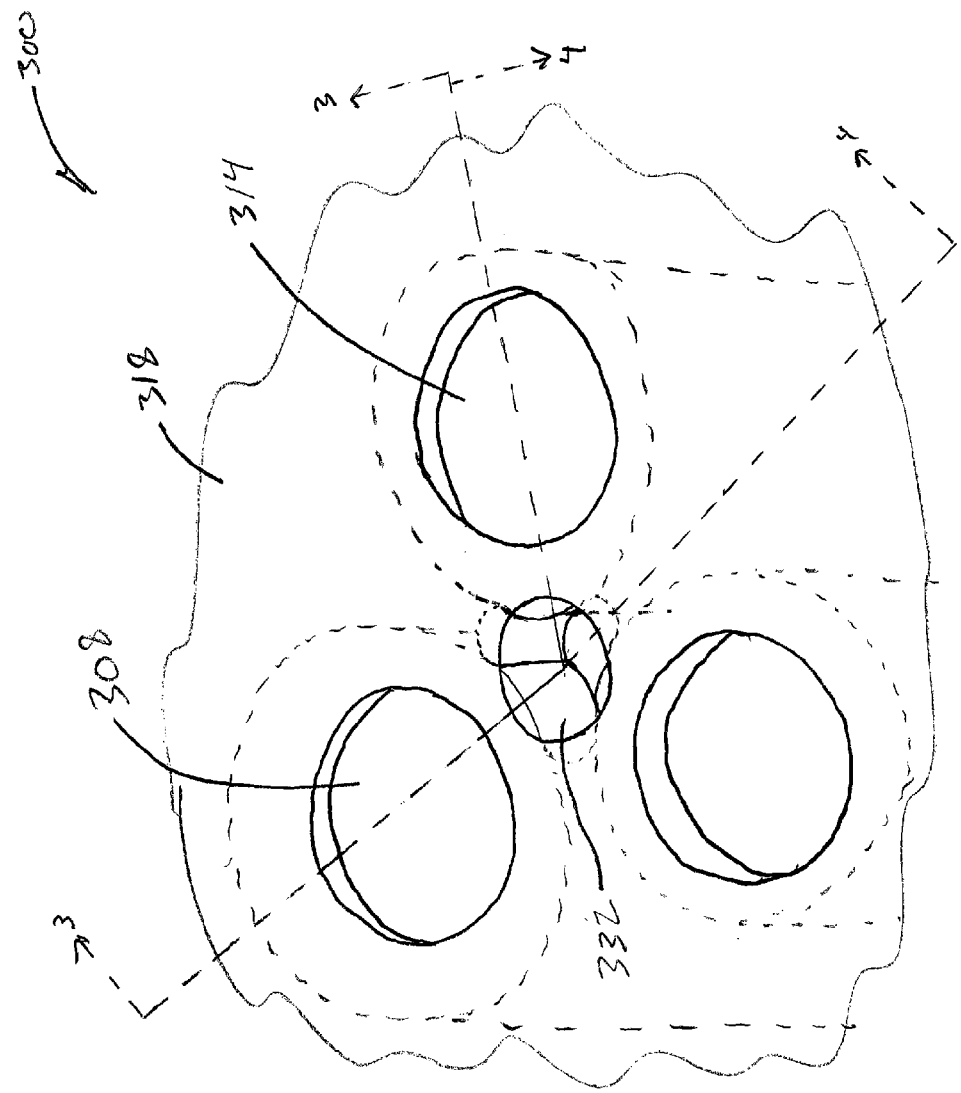
FIG. 2 is a partial perspective view of a clamshell, according to one embodiment.
Figure 3:
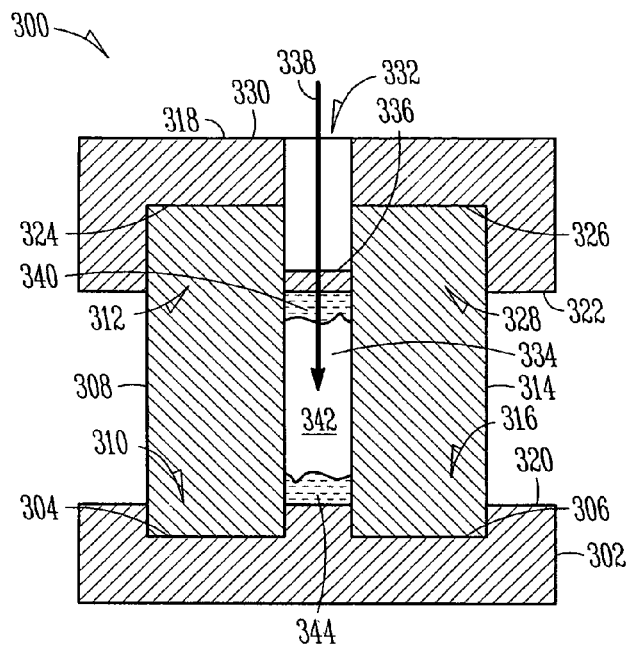
FIG. 3 is a cross section taken along line 3-3 in FIG. 2.
Figure 4:
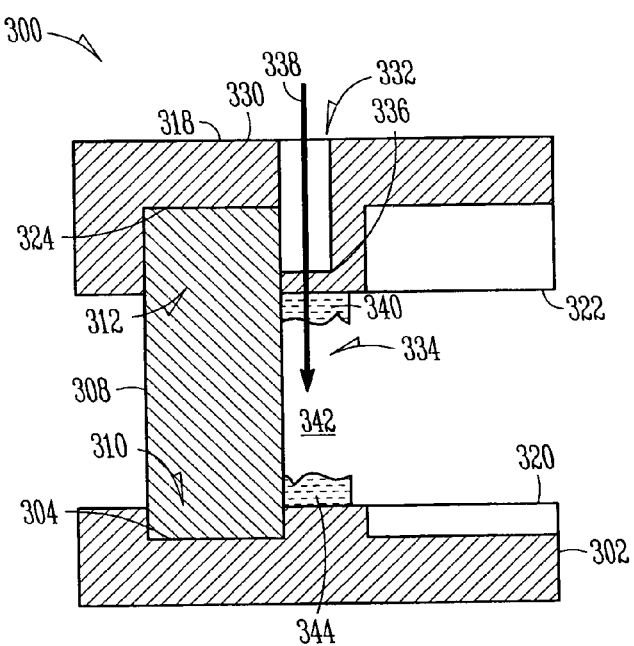
FIG. 4 is a cross section taken along line 4-4 in FIG. 2.

FIGS. 2-4 is a partial perspective view of a clamshell, according to one embodiment. The embodiments illustrate a bottom clamshell 302. In various embodiments, the bottom clamshell 302 defines at least a first 304 recess. In additional embodiments, the bottom clamshell defines a second bottom recess 306.

Various embodiments include a first battery 308. In various embodiments, the first battery 308 includes a first bottom portion 310 that is disposed in the first bottom recess 304. The first battery is cylindrical in some embodiments. Some embodiments include jelly roll batteries. Other embodiments include prismatic batteries. Prismatic batteries that are cylindrical are contemplated. Prismatic batteries including irregular shapes are contemplated. Prismatic batteries that have a different shape in a bottom portion 310 than they do a top portion 312 are contemplated. Various embodiments include a second battery 314. In certain examples, the second battery 314 includes a second bottom portion 316 disposed in the second bottom recess 306.

Various embodiments include a top clamshell 318. In various embodiments, one or both of the top 318 and bottom 302 clamshells include a non-chlorinated, nombrominated flam retardant polycarbonate acrylonitrile butadiene styrene plastic (PC/ABS). The top clamshell 318 is shown sandwiching the first battery 308 and the second battery 314 between a top surface of the bottom clamshell 320 and a bottom surface of the top clamshell 322. In certain examples, the top clamshell 318 defines a first recess 324. Embodiments are contemplated in which the top clamshell 318 is substantially planar. In various embodiments, a substantially planar clamshell has a uniform thickness and is plate shaped. Some embodiments of a substantially planar clamshell have a cup shape, as a cake pan might have. Other shapes are possible. In various embodiments, the bottom clamshell 302 is similarly planar, but the present subject matter extends to embodiments where the bottom clamshell 302 is not planar and is used with a planar top clamshell 318.

In various embodiments, the top 318 and bottom 302 clamshells sandwich a plurality of elongate cylindrical batteries including the first battery 308 and the second battery 314. In some of these embodiments, the each of the batteries is substantially parallel to the other. In some of these embodiments, each of the plurality of batteries is perpendicular to a planar top clamshell 318. In some embodiments, each of the plurality of batteries is perpendicular to a planar bottom clamshell 302. In some embodiments, each of the plurality of batteries is perpendicular to both a planar top clamshell 318 and a planar bottom clamshell 302.

In various examples, the top clamshell 318 defines a second top recess 326. In various embodiments, a top portion of the first battery 312 is disposed in the first top recess 324. In additional embodiments, a second top portion 328 of the second battery 314 is disposed in the second top recess 326.

Some embodiments include a fill port 332 extending from a top surface 330 of the top clamshell 318 through to the bottom surface 322 of the top clamshell 318. In various embodiments, the fill port 332 includes a cylindrical void in the top clamshell 318. Other shapes are possible. The size of the fill port 332 is shown to be of a first aspect ration with respect to the first battery 308, and other aspect ratios are possible. In other words, the fill port 332 is a needle sized fill port in the top clamshell 318. In various embodiments, the fill port 332 is part of a passage in fluid communication with a space 334 between the first battery 308 and second battery 314.

In various embodiments, a protrusion 336 is coupled to the top clamshell 318. In some embodiments, the protrusion 336 is coupled to the top clamshell 318 proximate to the fill port 332. In various embodiments, the protrusion 336 extending into the space 334. Embodiments are contemplated, including those illustrated in FIGS. 2-4, in which the protrusion 336 at least partially occludes a direct path 338 through the fill port 332 into the space 334. The protrusion 336 is molded into the top clamshell 318 in some embodiments, but other constructions are possible.

Various embodiments include an adhesive 340 at least partially disposed in the space 334. Less than 350 milliliters of adhesive per fill port is specified in some embodiments. Less than 300 milliliters of adhesive per fill port is specified in some embodiments. Some embodiments use 18650 sized batteries and specify 25 milliliters of adhesive per fill port. Other capacities are contemplated. The protrusion 336, in some embodiments, is molded such that it abuts a battery. In some embodiments, the manufacturing tolerance that controls the proximity of the battery, such as battery 308, to the protrusion 336 is selected such that an adhesive 340 disposed in the space 338 wicks along the battery, between the protrusion 336 and the non-protrusion portions of the top clamshell 318. In some of these embodiments, the adhesive 340 has a viscosity of from 20 to 30 centipoises at 25 degrees Celsius. In some embodiments, an adhesive 340 is free to drain into the space 338. In various embodiments, an adhesive 340 is selected so that it resists traveling to the surface 320.

Various embodiments include a bottom adhesive 344 that at least partially occupies portions of the first 304 and second 306 recesses of the bottom clamshell 302 that are not filled by one of the first 308 and second 314 batteries. In some embodiments, the top adhesive 340 fills the space 334 partially, with the bottom adhesive 344 also filling the space, and with a void 342 in the space disposed between the bottom adhesive 344 and the top adhesive 340. Embodiments including the void are contemplated, in part, to cut down on the total weight of the system 300. Embodiments that do not include a void 342 are contemplated. Embodiments in that a single epoxy at least partially occupies the space 334 as a monolith are additionally contemplated.

Various adhesives are contemplated. Epoxies are contemplated. Epoxies that are two part epoxies are contemplated. In various embodiments, one or both of the top 340 and bottom 344 adhesives are electrically insulative. In some embodiments, one or both of the top 340 and bottom adhesives 344 are thermally conductive. Embodiments using an adhesive including a thermal conductivity of around 0.18 Watts/meter degree Celsius are contemplated. Embodiments using an adhesive including a thermal conductivity of around 0.18 Watts/meter degree Celsius are contemplated. In some embodiments, a top adhesive 340 includes DP270 adhesive by 3M Company. In some embodiments, a bottom adhesive includes a thermally conductive potting adhesive. Some embodiments include a Stycast 2850 KT adhesive manufactured by Emerson and Cuming Company. Some of these embodiments are catalyzed using a 23LV compound. Other adhesives not listed herein expressly are also used in the present technology.

Figure 5:
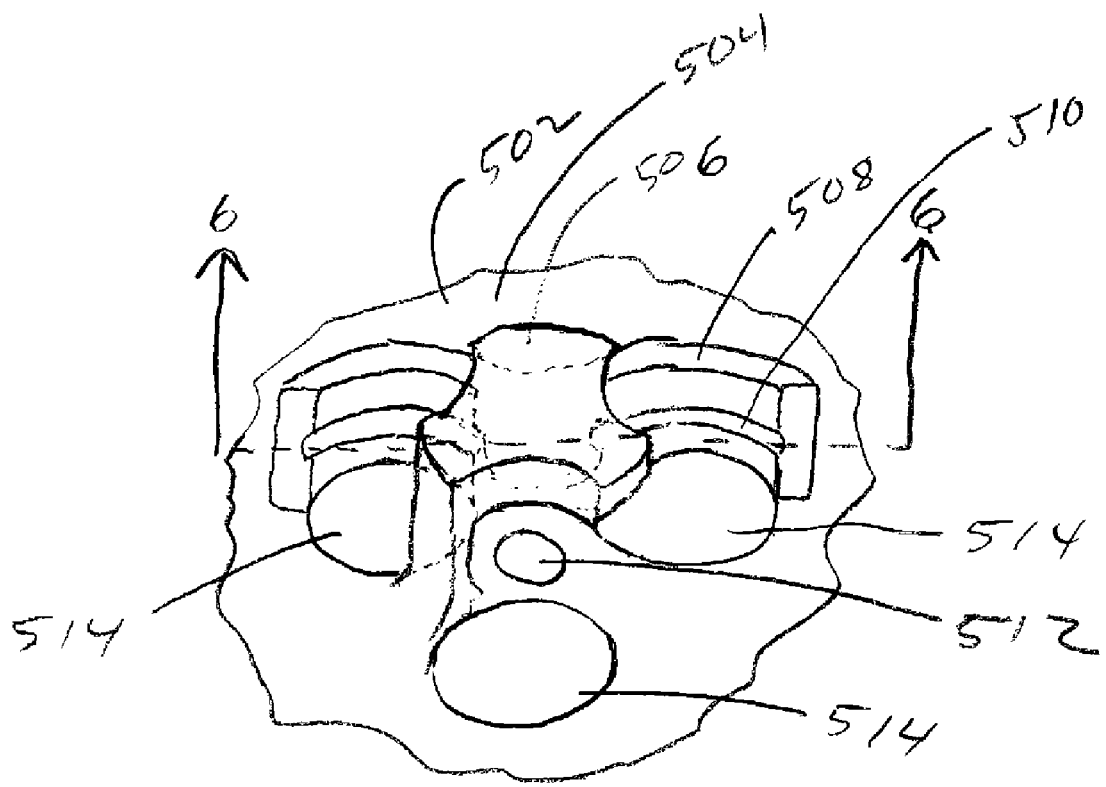
FIG. 5 is a partial perspective view of a clamshell including a protrusion, according to one embodiment.
Figure 6:
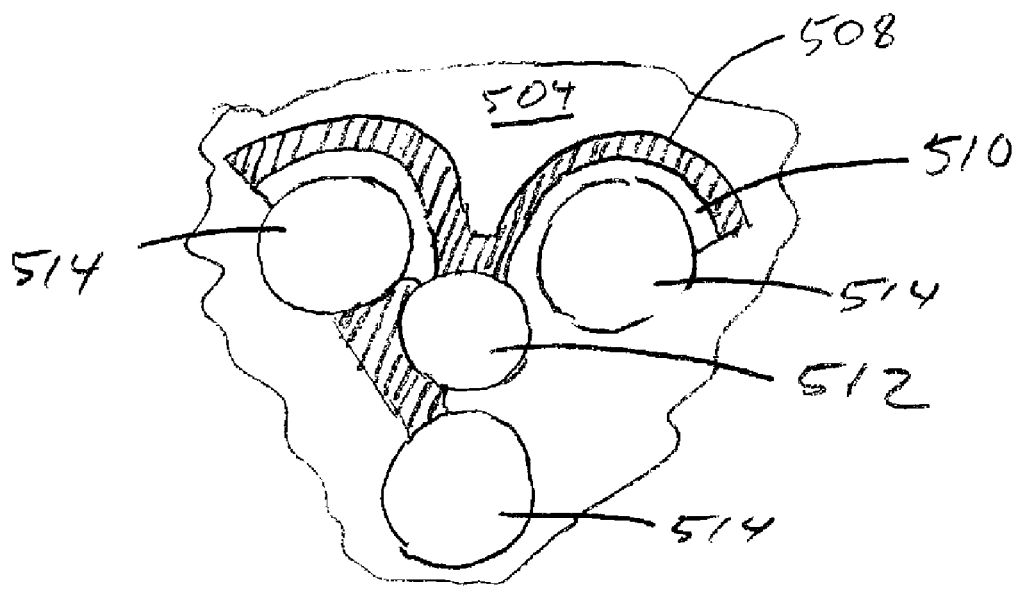
FIG. 6 is a cross section taken along line 6-6, according to one embodiment.

FIGS. 5-6 show a clamshell including a protrusion, according to one embodiment. FIG. 5 illustrates a partial perspective view of a clamshell 502 including a bottom surface 504 with a protrusion 506, according to one embodiment. FIG. 6 is a cross section taken along line 6-6, according to one embodiment.

In various embodiments, the protrusion 506 includes a wrapping portion 508 that at least partially wraps around the top portion of a first battery. In various embodiments, the protrusion 506 defines a trough 510 extending between the first battery and the protrusion, the trough in fluid communication with the fill port 512. Access ways 514 are provided to allow access to batteries, such as for interconnecting them, in some embodiments. In various embodiments, the trough 510 is sized to receive a specified amount of adhesive. Less than 350 milliliters is specified in some embodiments. Less than 300 milliliters is specified in some embodiments. Some embodiments use 18650 sized batteries and specify 25 milliliters. Other capacities are contemplated.

In some embodiments, the trough 510 is sized to encourage a specified fill rate such that adhesive wicks into the trough 510 and around a battery at a specified rate. In some embodiments, this rate is compatible with a specified setting time period, such that adhesive can be dispensed into the trough 510 at a specified rate and the adhesive can proceed to occupy at least some of the trough 510 and then set, adhering the protrusion to a battery. Various protrusions are contemplated, including those that are molded to the clamshell 502, as well as those that are affixed to the clamshell 502.

Figure 7:
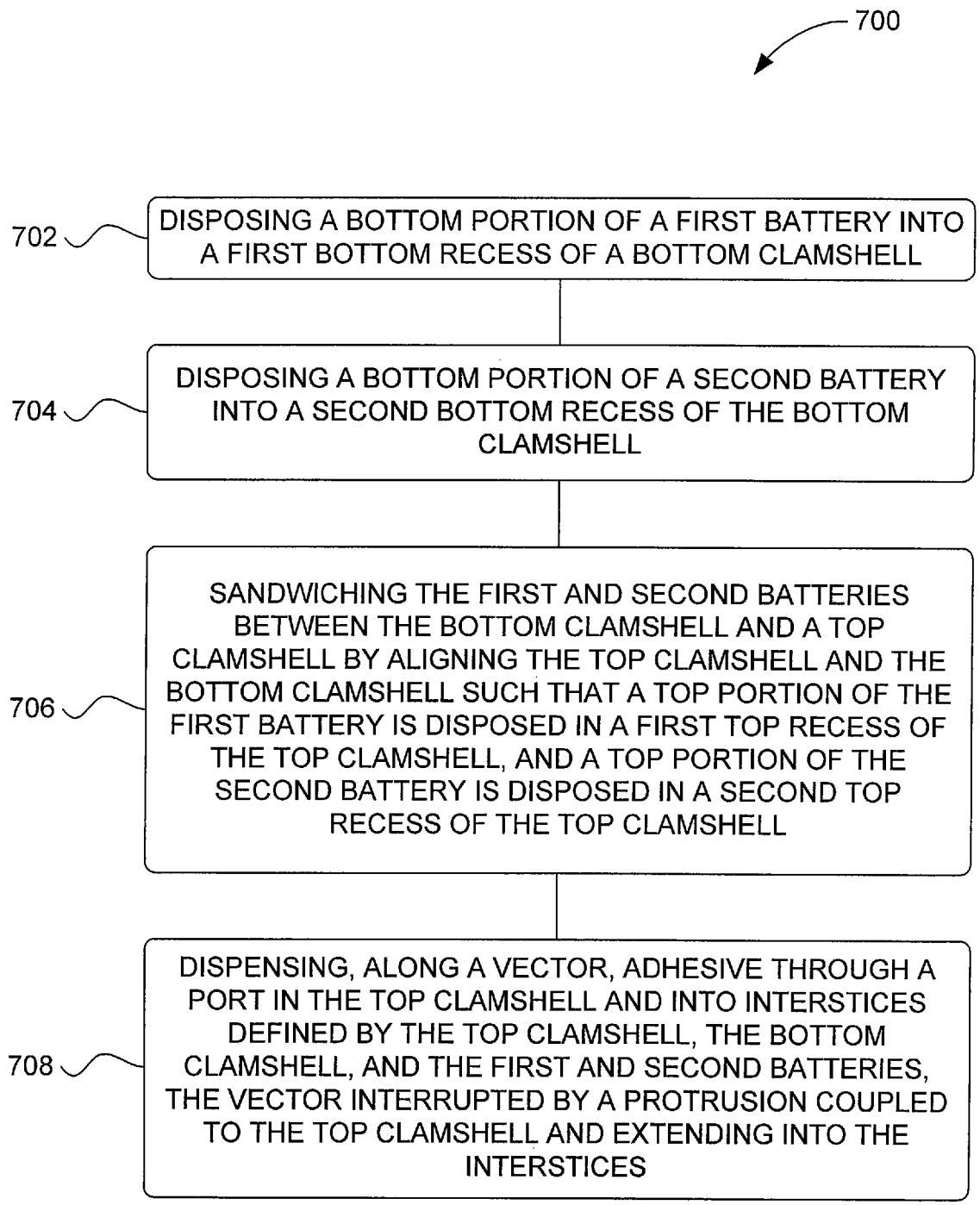
FIG. 7 is a process according to one embodiment.

FIG. 7 is a process 700 according to one embodiment. At 702, various embodiments include disposing a bottom portion of a first battery into a first bottom recess of a bottom clamshell. At 704, various embodiments include disposing a bottom portion of a second battery into a second bottom recess of the bottom clamshell. At 706, various embodiments include sandwiching the first and second batteries between the bottom clamshell and a top clamshell by aligning the top clamshell and the bottom clamshell such that a top portion of the first battery is disposed in a first top recess of the top clamshell, and a top portion of the second battery is disposed in a second top recess of the top clamshell. At 708, various embodiments include dispensing, along a vector, adhesive through a fill port in the top clamshell and into interstices defined by the top clamshell, the bottom clamshell, and the first and second batteries, the vector interrupted by a protrusion coupled to the top clamshell and extending into the interstices.

Optional methods are contemplated. Some methods include filling, with the adhesive, portions the first and second recesses of the top clamshell that are not filled by one of the first and second batteries. In some of these methods, the adhesive wicks into the interstices.

Some embodiments include positioning, along only a two dimensional plane, a nozzle to dispense the adhesive. Some of these embodiments include positioning the top and bottom clamshell such that the vector is in substantially parallel and directional alignment with an acceleration vector. Some embodiments are included in which the acceleration vector is gravity. Some embodiments include applying a first adhesive against gravity to a first internal (battery side) surface of a first clamshell (e.g., the bottom clamshell) through a fill port in the first clamshell. Some embodiments include flipping a clamshell assembly to apply a second adhesive against gravity to a second internal surface of the second clamshell through a second first fill port. Automatic robotics are used in some embodiments. Other configurations are possible.

Bonding with adhesive a first clamshell and a second clamshell together with batteries provides a number of benefits. One benefit is that the structure is less bendable. Another benefit is that the structure lasts longer because it does not suffer from as much vibrational wear. A further benefit is better heat exchange, via adhesive, between batteries and other components in an assembly, such as a cooling system. Other benefits not listed herein expressly are also possible.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. Apparatus, comprising:
   a plurality of batteries;
   a bottom clamshell, wherein said bottom clamshell includes a first plurality of battery mounting recesses, wherein each battery mounting recess of said first plurality of battery mounting recesses is adapted to receive a first end of a corresponding battery of said plurality of batteries; and
   a top clamshell, wherein said top clamshell includes a second plurality of battery mounting recesses, wherein each battery mounting recess of said second plurality of battery mounting recesses is adapted to receive a second end of said corresponding battery of said plurality of batteries, wherein said top clamshell further includes at least one adhesive fill port that includes a passage that extends completely through said top clamshell and to a void located between at least two of said plurality of batteries, and wherein said top clamshell further includes at least one protrusion corresponding to said at least one adhesive fill port, said protrusion occluding a direct path along a straight line through said fill port and through said passage to said void, wherein a portion of said protrusion abuts said at least two of said plurality of batteries, wherein said portion of said protrusion further defines and limits said void to an upper portion of said at least two of said plurality of batteries.

2. The apparatus of claim 1, wherein said plurality of batteries are comprised of cylindrical batteries, wherein the top clamshell and the bottom clamshell are each substantially planar, and wherein said plurality of batteries are substantially parallel to one another and perpendicular to each of the top clamshell and the bottom clamshell.

3. The apparatus of claim 1, wherein said portion of said protrusion at least partially wraps around said second end of said at least two of said plurality of batteries.

4. The apparatus of claim 1, wherein said portion of said protrusion defines a trough extending around said second end of said at least two of said plurality of batteries, the trough in fluid communication with the at least one adhesive fill port.

5. The apparatus of claim 1, wherein the top clamshell and the bottom clamshell are comprised of a non-chlorinated, nombrominated flame retardant polycarbonate acrylonitrile butadiene styrene plastic (PC/ABS).

6. The apparatus of claim 1, wherein said bottom clamshell further includes at least one lower adhesive fill port that includes a passage that extends completely through said bottom clamshell and to said void located between said at least two of said plurality of batteries, wherein said bottom clamshell further includes at least one protrusion corresponding to said at least one lower adhesive fill port, said protrusion occluding a direct path along a straight line through said lower fill port and through said passage to said void, wherein a portion of said protrusion abuts said at least two of said plurality of batteries.

7. The apparatus of claim 1, further comprising an adhesive injected through said at least one adhesive fill port.

8. The apparatus of claim 7, wherein the adhesive is a two part epoxy.

9. The apparatus of claim 7, wherein the adhesive has a viscosity of from 20 to 30 centipoises at 25 degrees Celsius.

10. The apparatus of claim 7, wherein the adhesive is electrically insulative.

11. Method, comprising:
   disposing a first end portion of each of a plurality of batteries into a corresponding battery mounting recess within a bottom clamshell;
   disposing a second end portion of each of said plurality of batteries into a corresponding battery mounting recess within a top clamshell such that said plurality of batteries are sandwiched between said bottom clamshell and said top clamshell;
   injecting, along a vector, adhesive through at least one adhesive fill port in the top clamshell and into a void defined in part by at least two of said plurality of batteries; and
   limiting flow of said adhesive into said void along said vector by a protrusion coupled to the top clamshell, wherein said protrusion occludes said vector, and wherein a portion of said protrusion abuts said at least two of said plurality of batteries and limits flow of said adhesive into said void to an upper portion of said at least two of said plurality of batteries.

12. The method of claim 11, wherein the adhesive wicks into the void.

13. The method of claim 11, further comprising positioning the top and bottom clamshell such that the vector is in substantially parallel, and directional alignment with an acceleration vector.

14. The method of claim 13, wherein the acceleration vector is gravity.

15. The method of claim 11, further comprising defining at least a first trough and a second trough, wherein said first trough is defined by said protrusion and a first of said at least two of said plurality of batteries and said second trough is defined by said protrusion and a second of said at least two of said plurality of batteries, wherein injecting said adhesive through said at least one adhesive fill port causes said adhesive to flow into said first and second troughs.

* * * * *